(12) United States Patent
Hill

(10) Patent No.: US 6,998,031 B1
(45) Date of Patent: Feb. 14, 2006

(54) ELECTRODE

(75) Inventor: Andrew Hill, Bramcote (GB)

(73) Assignee: Atraverda Limited, (GB)

( * ) Notice: Subject to any disclaimer, the term of this patent is extended or adjusted under 35 U.S.C. 154(b) by 0 days.

(21) Appl. No.: 10/019,606

(22) PCT Filed: Mar. 7, 2000

(86) PCT No.: PCT/GB00/02553

§ 371 (c)(1),
(2), (4) Date: May 1, 2002

(87) PCT Pub. No.: WO01/02626

PCT Pub. Date: Jan. 11, 2001

(30) Foreign Application Priority Data

| Jul. 1, 1999 | (GB) | 9915420 |
| Jul. 20, 1999 | (GB) | 9917015 |

(51) Int. Cl.
*C23F 13/08* (2006.01)

(52) U.S. Cl. ............ 204/280; 204/291; 204/196.1; 204/196.36; 204/196.37; 204/196.26; 204/196.11

(58) Field of Classification Search ............ 205/742, 205/758; 204/280, 291, 196.1, 196.36, 196.37, 204/196.26, 196.11
See application file for complete search history.

(56) References Cited

U.S. PATENT DOCUMENTS

| 4,033,849 A | 7/1977 | Pohto et al. |
| 4,154,667 A | 5/1979 | Pohto et al. |
| 4,410,410 A | 10/1983 | Deborski |
| 4,422,917 A * | 12/1983 | Hayfield ............ 204/196.01 |
| 4,486,288 A | 12/1984 | Linder |

FOREIGN PATENT DOCUMENTS

| DE | 198 44 329 A 1 | 3/2000 |
| EP | 0 224 851 A1 | 6/1987 |
| GB | 2 113 718 A | 8/1983 |
| WO | WO 97/11908 | 4/1997 |

* cited by examiner

*Primary Examiner*—Bruce F. Bell
(74) *Attorney, Agent, or Firm*—Caesar, Rivise, Bernstein, Cohen & Pokotilow, Ltd.

(57) ABSTRACT

An electrode comprises an elongate hollow tube made of porous titanium suboxide the inside wall of which is contacted at spaced apart locations by an electrical conductor so that the current is substantially uniformly distributed along the length of the electrode.

16 Claims, 1 Drawing Sheet

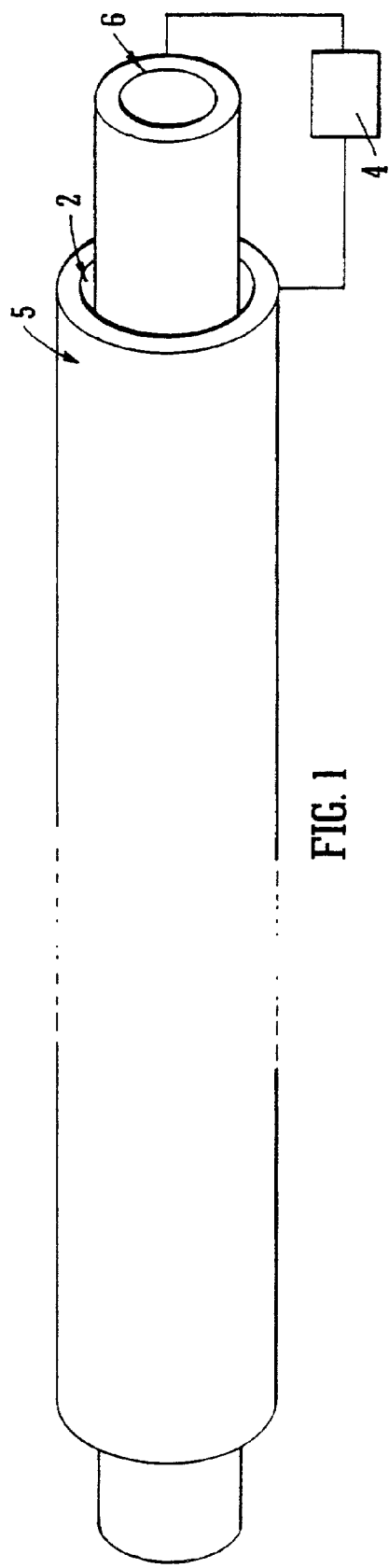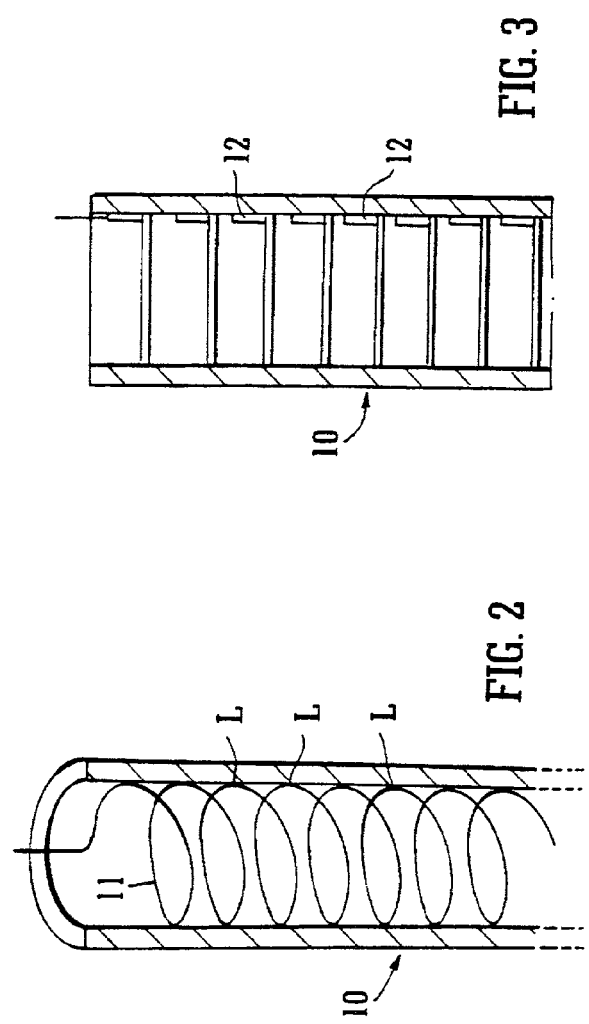

ELECTRODE

BACKGROUND OF THE INVENTION

The invention relates to an electrode formed of low conductivity material. Typically such electrodes take the form of an elongate hollow body. Preferably the body is made of a substoichiometric oxide of titanium or the like in which case it is likely that the most effective manufacturing route will result in the body being porous.

It has been calculated, by way of illustration, based on a tubular body 500 mm long, 18 mm outside diameter with a 3 mm wall thickness, made of a material with a volume resistivity of 30 m$\Omega$.cm, operating with an electrical connection at the one end, supplied with a current of 2.83 Amps (intended to provide a current density of 100 A/m$^2$ at all points along its length) that there will be a voltage drop of about 750 mV between the ends of such an electrode. In many electrochemical applications and as a result of this voltage drop there may be regions of the electrode where the potential is insufficient to perform its intended function. In the case of an electrolytic process operating at low voltages of the order of 1 to 5V between anode and cathode (the preferred situation since this leads generally to lower electrical costs) it cannot be guaranteed that all the surface area of the electrode will be equally effective, or effective at all. This is particularly true of electrolytic processes, such as water treatment, which are favoured by electrode surfaces which exhibit high gassing overpotential (such as titanium suboxides, lead dioxide, doped tin dioxide etc). In such cases, the actual current density can be shown to vary by more than 50% between the ends of such an electrode.

It is one object of this invention to provide a method of making an electrical connection to such an electrode which will solve this problem, particularly in the context of the electrode body being made of a porous material.

BRIEF SUMMARY OF THE INVENTION

In one aspect the invention provides an electrode comprising an elongate generally hollow body formed of porous relatively low electrical conductivity material, and connection means comprising an elongate electrically conductive member for being connected to a power source, the connection means extending along inside the body and contacting the inner wall surface of the body at a plurality of spaced apart locations along the length of the body for causing the electrical current from the power source to be distributed substantially uniformly along the electrode.

The electrically conductive member has an electrical conductivity substantially higher (at least 2 orders of magnitude) than that of the electrode body. In one form the connection means is a coiled length of spring wire shaped so as to mechanically urge the coils into contact with the inner wall surface of the hollow body at regular intervals. In another embodiment separate conductor lengths are present at longitudinal spaced apart locations and each contacts the inner wall of the body.

The hollow body may be formed from a range of materials. Most preferably the electrode body is formed of a substoichiometric oxide of titanium of the form TiO$_x$, where x is from about 1.99 to about 1.7. Such a body is generally porous since the more most cost-effective manufacturing routes to a cylindrical or hollow body of such materials results in a porous structure. Catalytic elements may be present. In a preferred embodiment the electrode body is formed of the substoichiometric oxide of titanium and the electrode conductor is a valve metal, whereby a durable electrical connection is made.

The body is preferably at least 200 mm long when the invention is valuable for use with materials for which the volume resistivity is higher than about 20 m$\Omega$.cm. If the material of the body is of higher resistivity then the invention is valuable for use where the body is at least 150 mm long.

The electrode of the invention is useful in many processes where cylindrical electrode geometry is advantageous, such as in the treatment of fluids to remove pollutants, and in the in-situ remediation of contaminated soils. Generally, water pollutants can be grouped in seven classes as follows:

1. Sewage and other oxygen-demanding wastes
2. Infectious agents
3. Plant nutrients
4. Exotic organic chemicals
5. Inorganic minerals and chemical compounds
6. Sediments
7. Radioactive substances.

Sewage and other oxygen-demanding wastes are generally carbonaceous organic materials that can be oxidised biologically (or sometimes chemically) to carbon dioxide and water. These wastes can be problematic. Infectious agents are usually found in waste water from municipalities, sanatoriums, tanning and slaughtering plants and boats. This type of pollutant is capable of producing disease in man and animals, including livestock.

Plant nutrients, (e.g. nitrogen and phosphorus) are capable of stimulating the growth of aquatic plants which interfere with water usage and which later decay to produce annoying odours and increase the amount of oxygen-demanding waste in the water.

Exotic organic chemicals include surfactants used in detergents, pesticides, various industrial products and the decomposition products of other organic compounds. Some of these compounds are known to be toxic to fish at very low concentrations. Many of these compounds are not readily biologically degradable.

Inorganic minerals and chemical compounds are generally found in water from municipal and industrial waste waters and from urban run-off. These pollutants can kill or injure fish and other aquatic life and can also interfere with the suitability of water for drinking or industrial use. A prominent example is the occurrence of mercury in water. Another example is salt pollution used to de-ice roads in winter in the northern, colder climates.

Sediments are soil and mineral particles washed from the land by storms and floodwaters, from croplands, unprotected forest soils, overgrazed pastures, strip mines, roads and bulldozed urban areas. Sediments fill stream channels and reservoirs; erode power turbines and pumping equipment, reduce the amount of sunlight available to aquatic plants; plug water filters; and blanket fish nests, spawn and food supplies, thereby reducing the fish and shell fish populations.

Radioactive substances in water environments usually result from the wastes of uranium and thorium mining and refining; from nuclear power plants and from industrial, medical, scientific utilisation of radioactive materials.

In another aspect the invention provides apparatus for use in electrolytic treating of a liquid comprising a chamber containing the fluid to be treated, an anode and a cathode at least one of which is an electrode as disclosed herein, and a supply of electrical current.

The invention is seen to particularly good effect in the treatment of water or aqueous media. In such a case electrical current is passed between an anode and a cathode across a small gap, through which the water is passed. Because of the structure of an electrode of the invention one can guarantee that a predetermined minimum voltage, e.g. 3V will be present along the length of the electrode.

Electrodes made of titanium suboxide has a high gassing overpotential, i.e. the voltage required before any appreciable current passes because of the low catalytic activity of the surface for splitting water into hydrogen and hydroxyl radicals. This level is in excess of 1V unless the surface is catalysed, so the effective driving force for current is at most about 2V (if the overall voltage is 3V as above) near the connector and 1.25 volts at the other end due to the voltage drop along the electrode in the absence of this invention, under the conditions described above.

In yet another aspect the invention provides a method of operating apparatus as disclosed herein, including supplying a current from the power source to the electrode of low conductivity at a current density of more than 10 A.m$^2$ of external anode area, whereby the voltage variation between any two points on the electrode is less than 200 mV.

BRIEF DESCRIPTION OF THE SEVERAL VIEWS DRAWINGS

In order that the invention may be well understood it will now be described by way of example with reference to the accompanying diagrammatic drawings, in which FIG. 1 is a diagram showing a representative electrochemical cell for the treatment of water;

FIG. 2 is an enlarged view partly in section of one embodiment shown in the diagram of FIG. 1 and FIG. 3 is the same of another embodiment.

DETAILED DESCRIPTION OF THE INVENTION

The water treatment system includes a cell whereby the water being treated is introduced to the annular space 2 between two elongate tubular bodied electrodes, with a small annular clearance in between. Each electrode is typically 500 mm long and is connected to the respective poles of a D.C. supply 4 so that one electrode is a cathode 5 and the other (in illustration, the inner electrode) an anode 6. The inner electrode is typically 18 mm outside diameter and the annular space is typically 2 mm. When current is passed through the electrodes an electrolytic reaction takes place, such as treating the water to remove pollutants. The water passes in the annular clearance between the electrodes. Typically the electrical connection is made to one end of the inner electrode and a current of about 2.83 amps is supplied. If the inner electrode is made of a titanium suboxide tube with a wall thickness of 3 mm and which has a volume resistivity of ~30 mΩ.cm, a voltage drop of about 750 mV will occur down the length of the inner electrode in the absence of this invention, so that the cell potential at one end will be about 3V and at the other 2.25V.

According to the invention the anode 6 of FIG. 1 comprises an elongate tube 10 formed of titanium suboxide by moulding, extrusion or the like. The tube is about 500 mm long, having an inner diameter of 12 mm and an outer diameter of 18 mm, i.e. a wall thickness of about 3 mm.

According to one embodiment of the invention and as shown in FIG. 2, the current feeder comprises a length of titanium spring wire 11 which extends along the inner bore of the tube. One end of the wire 11 is connected to the power source 4, the other end may be sealed by an end cap. The coils of the spring are mechanically urged into contact with the inner wall of the tube at longitudinally spaced apart locations L whereby the supply is distributed substantially uniformly along the length of the tube. As a result the cell voltage is substantially the same along the entire length of the cell and hence the entire length is effective in its electrochemical function, such a killing micro-organisms, oxidising and/or reducing contaminants.

The cathode may be the same shape as the anode or it may be of standard design.

In the embodiment shown in FIG. 3, the coil spring is replaced by a series of individual connectors 12 spaced apart along the length of the tube.

The invention is not limited to the embodiment shown. The water treatment apparatus may comprise banks of cells, and include other treatments. The electrode need not be circular in section. Although the invention has been described in relation to water treatment, the electrode has value in any situation where an elongate electrode is useful. Such applications include in-situ soil remediation, and electrochemical synthesis reactions, e.g. a redox system.

What is claimed is:

1. An electrode comprising an elongate generally hollow body formed of porous relatively low electrical conductivity material, and connection means comprising an elongate electrically conductive member for being connected to a power source, the connection means extending along inside the said body and contacting the inner wall surface of the body at a plurality of spaced apart locations along the length of the body for causing the electrical current from the power source to be distributed substantially uniformly along the electrode.

2. An electrode according to claim 1, wherein the connection means is an elongate spring made from spring wire shaped so as to mechanically urge the coils into contact with the inner wall surface of the body at longitudinally spaced apart locations.

3. An electrode according to claim 1, wherein the electrically conductive member has a conductivity at least two orders of magnitude higher than that of the body.

4. An electrode according to claim 1, wherein the electrode body is formed of a substoichiometric suboxide of titanium of the form TiO$_x$ where x is from about 1.99 to about 1.7.

5. An electrode according to any claim 1, wherein the body is at least 200 mm long.

6. An electrode according to claim 1, wherein the electrical conductor is made of a valve metal.

7. Apparatus for performing a redox type reaction, incorporating an electrode according to claim 1.

8. An electrode comprising an elongate generally hollow body formed of porous relatively low electrical conductivity material, and connection means comprising an elongate electrically conductive member for being connected to a power source, the connection means extending along inside the said body and contacting the inner wall surface of the body for causing the electrical current from the power source to be distributed substantially uniformly along the electrode, wherein the connection means comprise separate conductors in contact with the inner wall surface of the body at respective longitudinally spaced apart locations.

9. Apparatus for use in electrolytic treatment of a liquid, the apparatus comprising:
(i) an electrochemical cell having first and second spaced electrodes, the first electrode being the form of an elongate generally hollow body made of porous relatively low electrical conductivity material; and (ii) power supply means electrically connected to the electrodes for causing electrical current to flow between them;

the electrical connection between the power supply means and the first electrode including an elongate electrically conductive member, said member extending along inside the said hollow body and contacting the porous material of the body at a plurality of spaced apart locations along the length of the inner wall surface of the body for causing the electrical current from the power supply means to be distributed substantially uniformly along said first electrode.

10. Apparatus according to claim 9, wherein the apparatus is coupled to a source of aqueous effluent or water and the apparatus is adapted to remove pollutants therefrom.

11. Apparatus according to claim 9, wherein the power source is operable to supply current to the electrode at a density of above 10 A/m$_2$ of external area and wherein the voltage variation between any two points on the electrode is less than 200 mV.

12. An in-situ soil remediation system incorporating an electrode, the electrode comprising an elongate generally hollow body formed of porous relatively low electrical conductivity material, and connection means comprising an elongate electrically conductive member for being connected to a power source, the connection means extending along inside the said body and contacting the inner wall surface of the body for causing the electrical current from the power source to be distributed substantially uniformly along the electrode.

13. An in-situ soil remediation system comprising:
(i) an elongate hollow electrode made of titanium oxide (TiO$_x$) and having inner and outer surfaces;
(ii) an electrical voltage source; and
(iii) connection means connected between said source and one of said surfaces for electrical current to flow from said source to said one of said surfaces and through the body of the electrode to the other of said surfaces;

said connection means comprising a plurality of electrically conductive portions distributed along the length of the electrode for causing said current flowing through said electrode body to be substantially evenly distributed along the length of the electrode.

14. An electrode comprising:
(i) a porous elongate hollow body made of titanium oxide (TiO$_x$) and having inner and outer surfaces; and
(ii) connection means for being connected to an electrical voltage source and connected to one of said surfaces for electrical current to flow from said source to said one of said surfaces and trough the body of the electrode to the other of said surfaces;

said connection means comprising a plurality of electrically conductive portions distributed along the length of the electrode for causing said current flowing through said electrical body to be substantially evenly distributed along the length of the electrode.

15. An electrode comprising an elongate generally hollow body formed of low electrical conductivity material and having an electrical resistance along the body of 280 milli-Ohms or more, and an electrical conductor in the form of an elongate spring means comprising interconnected portions made of spring material, said spring means being located inside said body for said portions to be urged by spring action into contact with the inner wall surface of the body at respective spaced apart locations along the length of the body, the electrical conductor being operable for being connected to a power source and for causing a resulting electrical current in the electrode to be distributed substantially uniformly along the electrode.

16. An electrode according to claim 15, wherein the electrode material has a resistivity of at least 20 milli-Ohms/centimeter.

* * * * *

UNITED STATES PATENT AND TRADEMARK OFFICE
CERTIFICATE OF CORRECTION

PATENT NO. : 6,998,031 B1
DATED : February 14, 2006
INVENTOR(S) : Andrew Hill

It is certified that error appears in the above-identified patent and that said Letters Patent is hereby corrected as shown below:

<u>Title page,</u>
Item [22], PCT Filed, delete "Mar. 7, 2000" and add -- July 3, 2000 --.

Signed and Sealed this

Thirtieth Day of May, 2006

JON W. DUDAS
*Director of the United States Patent and Trademark Office*